(12) United States Patent
Mueller et al.

(10) Patent No.: US 11,770,202 B2
(45) Date of Patent: Sep. 26, 2023

(54) USER STATION FOR A MOBILE COMMUNICATION SYSTEM AND METHOD FOR ITS OPERATION

(71) Applicant: Robert Bosch GmbH, Stuttgart (DE)

(72) Inventors: Andreas Mueller, Waiblingen (DE); Johannes Von Hoyningen-Huene, Sindelfingen (DE); Monique Duengen, Hannover (DE); Steven Dietrich, Lohr Am Main (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/665,107

(22) Filed: Oct. 28, 2019

(65) Prior Publication Data

US 2020/0145120 A1    May 7, 2020

(30) Foreign Application Priority Data

Nov. 6, 2018   (DE) .......................... 102018218864.5

(51) Int. Cl.
| | |
|---|---|
| *H04J 13/16* | (2011.01) |
| *H04W 72/20* | (2023.01) |
| *H04W 72/044* | (2023.01) |

(52) U.S. Cl.
CPC ............. *H04J 13/16* (2013.01); *H04W 72/20* (2023.01); *H04W 72/0466* (2013.01)

(58) Field of Classification Search
None
See application file for complete search history.

(56) References Cited

U.S. PATENT DOCUMENTS

| | | | | |
|---|---|---|---|---|
| 6,016,322 A | * | 1/2000 | Goldman | .......... H04W 56/0005 370/337 |
| 2009/0161599 A1 | * | 6/2009 | Haartsen | ........... H04W 74/0891 455/434 |
| 2015/0045061 A1 | * | 2/2015 | Da | ......................... H04W 4/023 455/456.2 |
| 2015/0163767 A1 | * | 6/2015 | Shaw | ..................... H04W 64/00 455/456.1 |
| 2017/0303224 A1 | * | 10/2017 | Choi | .................... H04L 27/2613 |
| 2019/0159149 A1 | * | 5/2019 | Ryu | .................. H04W 56/0045 |
| 2019/0268779 A1 | * | 8/2019 | Peroulas | ................ H04W 24/06 |
| 2020/0053712 A1 | * | 2/2020 | Josan | .................... H04B 7/0408 |
| 2021/0022054 A1 | * | 1/2021 | Tsuda | ............. H04W 36/00835 |
| 2021/0168869 A1 | * | 6/2021 | Gupta | ................. H04L 27/2607 |

* cited by examiner

*Primary Examiner* — Srinivasa R Reddivalam
(74) *Attorney, Agent, or Firm* — Norton Rose Fulbright US LLP; Gerard Messina

(57) ABSTRACT

A method for operating a user station for a mobile communication system, which includes at least one master station, using code division multiple access (CDMA), including the following steps: ascertaining a first timing advance value for a data transmission from the user station to the master station as a function of first pieces of position information characterizing a position of the user station, transmitting first data to the master station using the first timing advance value.

19 Claims, 3 Drawing Sheets

USER STATION FOR A MOBILE COMMUNICATION SYSTEM AND METHOD FOR ITS OPERATION

RELATED APPLICATION INFORMATION

Figure 1:
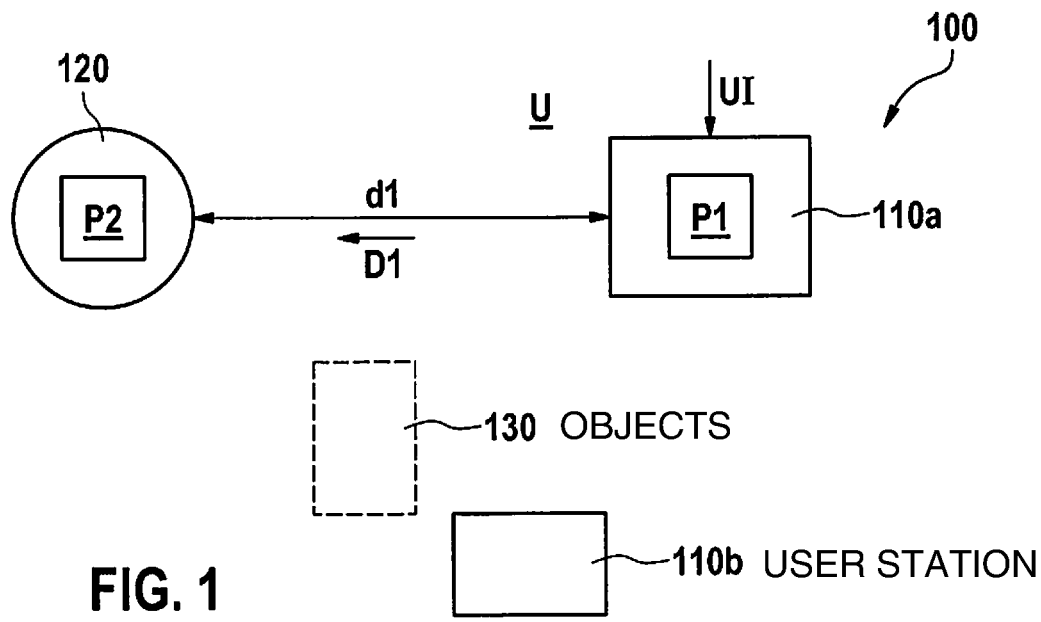

The present application claims priority to and the benefit of German patent application no. DE 10 2018 218 864.5, which was filed in Germany on Nov. 6, 2018, the disclosure of which is incorporated herein by reference.

FIELD OF THE INVENTION

The disclosure relates to a method for operating a user station for a mobile communication system, which includes at least one master station, using code division multiple access (CDMA).

The disclosure furthermore relates to such a user station.

BACKGROUND INFORMATION

Mobile communication systems, for example, cellular mobile radio systems, which operate according to the CDMA principle, are believed to be understood.

SUMMARY OF THE INVENTION

Specific embodiments relate to a method for operating a user station for a mobile communication system, which includes at least one master station, using code division multiple access (CDMA), including the following steps: ascertaining a first timing advance value for a data transmission from the user station to the master station as a function of first pieces of position information characterizing a position of the user station, transmitting first data to the master station using the first timing advance value. For this purpose, existing a priori knowledge provided in the form of the first pieces of position information is advantageously utilized to obtain the first timing advance value, which enables a synchronization with the master station. The first timing advance value characterizes in particular a time offset by which the user station—in relation to a time base predefined by the master station—may emit the first data earlier so that the first data arrive at the master station synchronized with the time base of the master station in consideration of the corresponding signal propagation times (for example, due to the speed of light in the medium surrounding the user station).

In further specific embodiments, it is provided that the first pieces of position information are already provided in the user station, for example, on the application level, for example, in the form of a position (for example, including GPS (and/or GLONASS and/or Galileo and/or other) coordinates and/or pieces of position information which are also obtainable, for example, with the aid of an interior ("indoor") locating system) and/or speed and/or movement direction of the user station, in particular ascertained by corresponding sensors (for example, GPS module or another comparable system, see above (indoor coordinates also possible)).

In further specific embodiments, it is provided that the ascertainment of the first timing advance value is carried out as a function of the first pieces of position information and of second pieces of position information which characterize a position of the master station. A present distance between the user station and the master station may be ascertained in this way, for example, and the first timing advance value may be derived therefrom. In further specific embodiments, the second pieces of position information may be predefined, for example, by configuration or parameterization of the user station.

In further specific embodiments, the second pieces of position information may alternatively or additionally be selected or ascertained by the user station as a function of the first pieces of position information. For example, the user station may have a list, in particular a map, of one or more master stations with their position, and based on the first pieces of position information, the user station may ascertain a spatially proximate master station or the closest master station or its position from this list or map.

In further specific embodiments, it is provided that the ascertainment of the first timing advance value is additionally carried out as a function of pieces of surroundings information, which characterize an influence of the surroundings of the user station and/or the master station on the data transmission from the user station to the master station. Even more precise synchronization of the data transmission to the master station may thus be carried out.

In further specific embodiments, it is provided that the method includes the following steps: ascertaining whether a line-of-sight (LOS) condition exists for the data transmission from the user station to the master station. In this case, the first timing advance value ascertained as a function of the distance (as a function of the first and second pieces of position information) may be used. In further specific embodiments, it is accordingly provided that the first timing advance value is ascertained as a function of a distance between the user station and the master station.

In further specific embodiments, it is provided that a greater value than the first timing advance value ascertained as a function of the distance is used for the transmission of the first data if a line-of-sight condition does not exist, since in these cases the signal propagation time is generally greater than in the case of a direct line-of-sight condition.

In further specific embodiments, it is provided that the method includes the following steps: receiving pieces of control information from the master station with respect to a second timing advance value to be used for future data transmissions to the master station. The master station may accordingly predefine the pieces of control information, for example, to predefine or influence a control loop for adapting the timing advance values to be used from now on by the user station.

In further specific embodiments, it is provided that the ascertainment of the second timing advance value is carried out as a function of at least one of the following elements: first timing advance value, first pieces of position information, second pieces of position information, pieces of surroundings information, pieces of control information. A presently usable timing advance value for data transmissions to the master station (uplink data transmissions) may thus be ascertained particularly precisely.

Further specific embodiments relate to a user station for a mobile communication system, which includes at least one master station, using code division multiple access (CDMA), the user station being configured to carry out the following steps: ascertaining a first timing advance value for a data transmission from the user station to the master station as a function of first pieces of position information characterizing a position of the user station, transmitting first data to the master station using the first timing advance value.

In further specific embodiments, it is provided that the user station is configured to carry out the method according to the specific embodiments.

Further specific embodiments relate to a mobile communication system using code division multiple access (CDMA), including at least one master station and at least one user station according to the specific embodiments.

Further specific embodiments relate to a use of the method according to the specific embodiments and/or the user station according to the specific embodiments and/or the mobile communication system according to the specific embodiments for synchronizing data transmissions from the user station to the master station.

Further features, possible applications, and advantages of the present invention result from the following description of exemplary embodiments of the present invention, which are shown in the figures of the drawings. All features which are described or shown form the subject matter of the present invention as such or in any arbitrary combination, independently of their summary in the patent claims or their back-reference and irrespective of their formulation and representation in the description or in the drawings, respectively.

FIG. 1 schematically shows a simplified block diagram of a mobile communication system according to specific embodiments.

Figure 2:
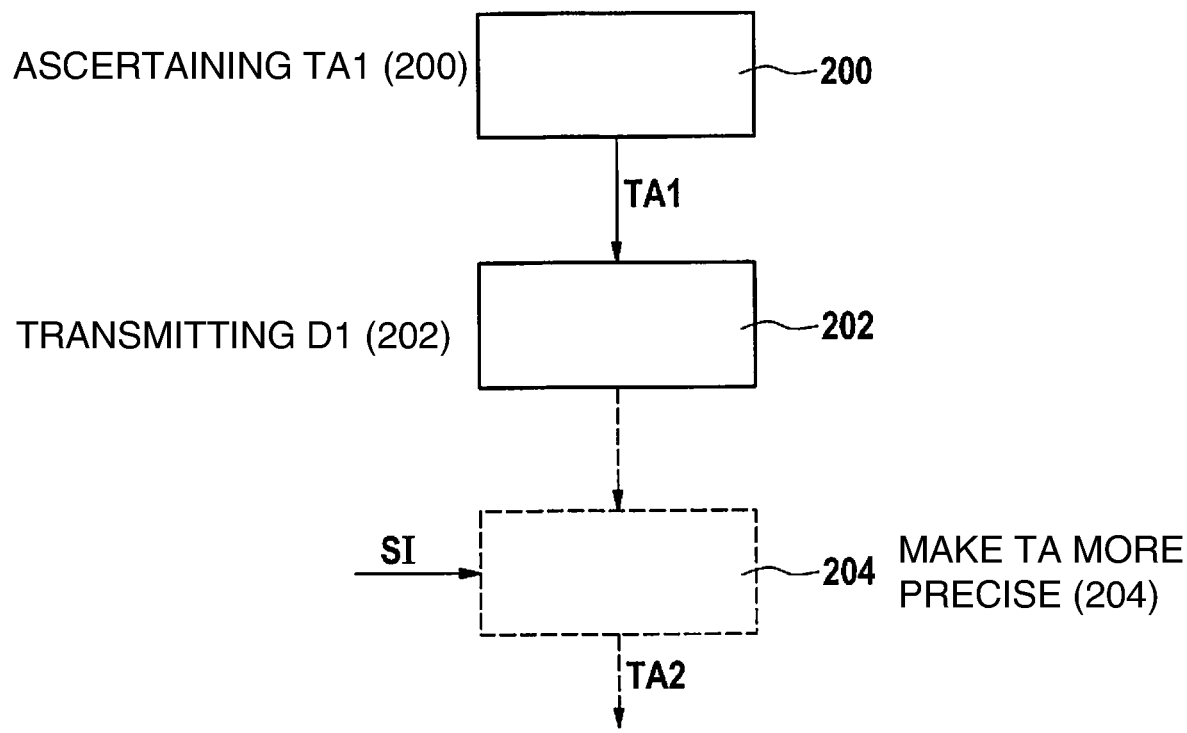

FIG. 2 schematically shows a simplified flowchart of a method according to specific embodiments.

Figure 3:
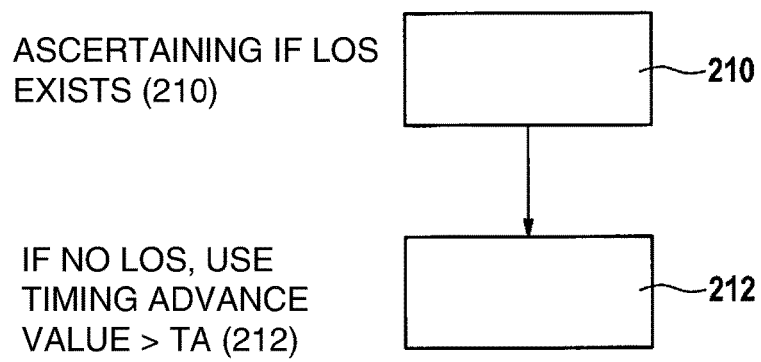

FIG. 3 schematically shows a simplified flowchart of a method according to further specific embodiments.

Figure 4:
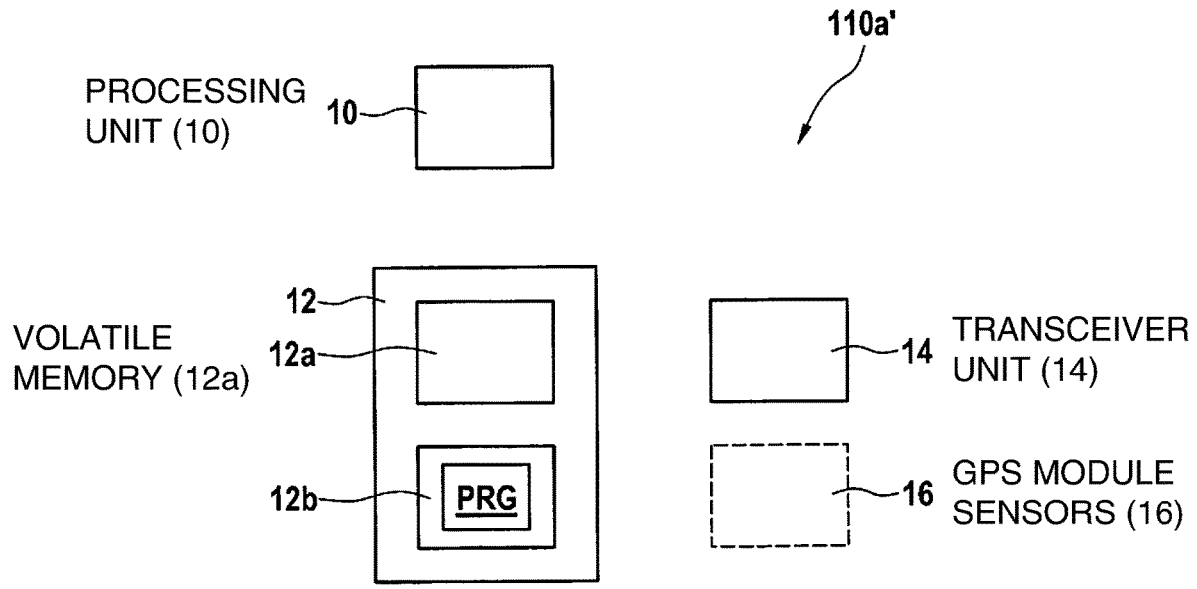

FIG. 4 schematically shows a simplified block diagram of a user station according to specific embodiments.

Figure 5:
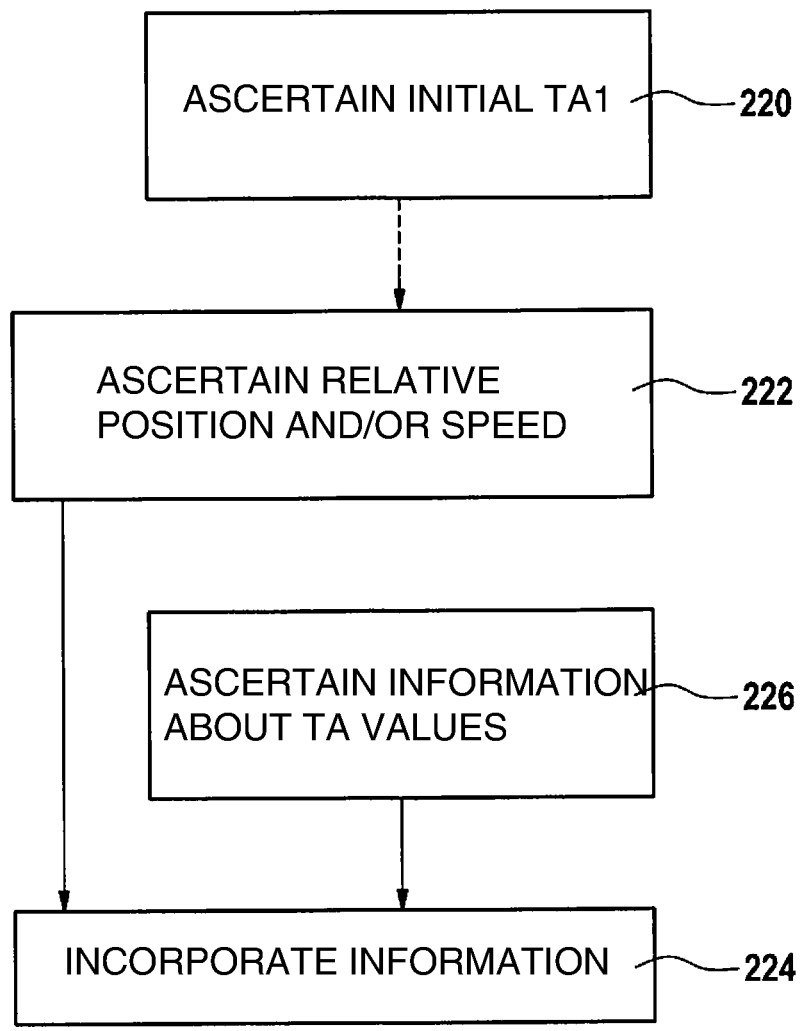

FIG. 5 schematically shows a simplified flowchart of a method according to further specific embodiments.

DETAILED DESCRIPTION

FIG. 1 schematically shows a simplified block diagram of a mobile communication system 100 according to specific embodiments. Communication system 100 may be, for example, a cellular mobile radio system in which multiple user stations 110a, 110b exchange data with a master station 120 ("base station"). The communication system uses a code division multiple access (CDMA) method, different user stations 110a, 110b each using different codes, which are orthogonal to one another, for example, to decorrelate data to be transmitted to master station 120 from one another.

Specific embodiments relate to a method for operating a user station 110a for CDMA communication system 100, the method including the following steps, cf. also the flowchart from FIG. 2: ascertaining 200 a first timing advance (TA) value TA1 for a data transmission from user station 110a (FIG. 1) to master station 120 as a function of first pieces of position information P1 characterizing a position of user station 110a, transmitting 202 (FIG. 2) first data D1 (FIG. 1) to master station 120 using first timing advance value TA1. For this purpose, a priori knowledge advantageously provided in the form of first pieces of position information P1 is advantageously utilized to obtain first timing advance value TA1, which enables an (initial) synchronization with master station 120. First timing advance value TA1 characterizes in particular a time offset, by which user station 110a—in relation to a time base predefined by master station 120 (for example, signaled with the aid of a "downlink control channel", i.e., a signaling channel for the transmission of pieces of control information by master station 120 to user stations 110a, 110b)—may emit first data D1 earlier so that first data D1 arrive at master station 120 synchronized with the time base of master station 120 in consideration of the corresponding signal propagation times (for example, due to the speed of light in the medium surrounding user station 110a).

After the step of transmission 202 (FIG. 2), the TA value may optionally be made more precise or updated, cf. optional step 204. This is described in greater detail hereafter.

In further specific embodiments, it is provided that first pieces of position information P1 are already provided in user station 110a, cf. FIG. 1, for example, on an application level, for example, in the form of a position (for example, including GPS coordinates) and/or speed and/or movement direction of user station 110a, ascertained in particular by corresponding sensors (for example, GPS module, not shown in FIG. 1).

In further specific embodiments, it is provided that ascertainment 200 (FIG. 2) of first timing advance value TA1 is carried out as a function of first pieces of position information P1 (FIG. 1) and second pieces of position information P2, which characterize a position of master station 120. A present distance d1 between user station 110a and master station 120 may be ascertained in this way, for example, and first timing advance value TA1 may be derived particularly accurately therefrom. In further specific embodiments, second pieces of position information P2 may be predefined, for example, by configuration or parameterization of user station 110a.

In further specific embodiments, second pieces of position information P2 may alternatively or additionally be selected or ascertained by user station 110a as a function of first pieces of position information P1. For example, user station 110a may have a list, in particular a map, of one or multiple master stations 120 with their position, and based on first pieces of position information P1, user station 110a may ascertain a spatially proximate or closest master station 120 or its position from this list or map.

In further specific embodiments, it is provided that ascertainment 200 (FIG. 2) of first timing advance value TA1 is additionally executed as a function of pieces of surroundings information or environmental information UI, which characterize an influence of surroundings U of user station 110a, 110b and/or master station 120 on the data transmission from user station 110a to master station 120. A still more precise synchronization of the data transmission to master station 120 may thus be carried out.

In further specific embodiments, pieces of surroundings information UI may include, for example, information about objects 130 in surroundings U, which may, for example, have an influence on the data transmission from user station 110a to master station 120, for example, by shading or concealing a direct line-of-sight condition between user station 110a and master station 120. This is shown by way of example for further user station 110b in FIG. 2. An object 130 which potentially influences the data transmission from user station 110b to master station 120 is located in the line-of-sight between user station 110b and master station 120. This circumstance may be characterized in further specific embodiments by pieces of surroundings information UI, so that the presence of object 130 may be taken into consideration for the ascertainment of the first timing advance value by incorporating pieces of surroundings information UI into the ascertainment from step 200 (FIG. 2).

In further specific embodiments, cf. the flow chart from FIG. 3, it is provided that the method includes the following step: ascertaining 210 whether a line-of-sight (LOS) condition exists for the data transmission from user station 110a to master station 120. In this case, first timing advance value TA1 (FIG. 2), which is ascertained as a function of distance (as a function of first and second pieces of position information P1, P2), may be used. In further specific embodiments, it is accordingly provided that first timing advance value TA1 is ascertained as a function of distance dl between user station 110*a* and master station 120.

In further specific embodiments, it is provided that a greater value than first timing advance value TA1 ascertained as a function of distance is used for the transmission of first data Dl (FIG. 1) if a line-of-sight condition does not exist, since in these cases the signal propagation time is generally greater than in the case of a direct line-of-sight condition. This is indicated by step 212 from FIG. 3 and is taken into consideration, for example, for user station 110*b* (FIG. 1), whose direct line-of-sight condition to master station 120 is hindered by object 130, which may be, for example, a building or a terrain formation.

In further specific embodiments, it is provided that the method includes the following steps: receiving pieces of control information SI (FIG. 2) from master station 120 with respect to a second timing advance value TA2 to be used for future data transmissions to master station 120. Master station 120 may accordingly predefine pieces of control information SI to predefine or influence a control loop for adapting the timing advance values to be used from now on by the user station. This may take place, for example, in optional step 204 of the flow chart from FIG. 2, thus, for example, following above-described steps 200, 202. In further specific embodiments, step 204 may also be repeated, which may be periodically, to adapt second timing advance value TA2 to present conditions, for example, a changing position of user station 110*a*, 110*b* and/or changing surroundings conditions (mobile object 130) and/or propagation conditions for the data transmission.

In further specific embodiments, it is provided that ascertainment 204 of second timing advance value TA2 is carried out as a function of at least one of the following elements: first timing advance value TA1, first pieces of position information P1, second pieces of position information P2, pieces of surroundings information UI, pieces of control information SI. A presently usable timing advance value for data transmissions to master station 120 (uplink data transmissions) may thus be ascertained particularly precisely.

Further specific embodiments relate to a user station 110*a*, 110*b* (FIG. 1) for a mobile communication system 100, which includes at least one master station 120, using code division multiple access (CDMA), user stations 110*a*, 110*b* being configured to carry out the method described above by way of example with reference to FIGS. 2 and 3.

Further specific embodiments relate to a mobile communication system 100 using code division multiple access (CDMA), including at least one master station 120 and at least one user station 110*a*, 110*b* according to the specific embodiments.

Further specific embodiments relate to a use of the method according to the specific embodiments and/or user station 110*a*, 110*b* according to the specific embodiments and/or mobile communication system 100 according to the specific embodiments for synchronization of data transmissions from user station 110*a*, 110*b* to master station 120. So-called multi-access interference may thus advantageously be reduced or avoided, which otherwise occurs because of a lack of synchronization of multiple user stations 110*a*, 110*b* with one another. Such a synchronization is not absolutely required with application of the CDMA principle in the case of some systems, in particular for the uplink data transmissions, but it advantageously enables an improved transmission due to a higher transmission capacity and a simpler demodulation at the receiver (for example, master station 120).

FIG. 4 schematically shows a simplified block diagram of a user station 110*a*' according to further specific embodiments. For example, user stations 110*a*, 110*b* from FIG. 1 may have configuration 110*a*' shown in FIG. 4. User station 110*a*' includes a processing unit 10 (for example, microprocessor and/or microcontroller and/or programmable logic component, in particular FPGA, and/or application-specific integrated circuit (ASIC), and/or digital signal processor (DSP), and/or a combination thereof) and a storage unit 12. Storage unit 12 includes a volatile memory 12*a*, in particular a working memory (RAM), and a nonvolatile memory 12*b*, for example, a flash EEPROM. At least one computer program PRG for processing unit 10 is stored in nonvolatile memory 12*b*, which controls the execution of the method according to the specific embodiments and/or another operation of user station 110*a*'. A transceiver unit 14 is optionally provided for transmitting data Dl (FIG. 1) to master station 120 (uplink direction) and receiving data transmitted by master station 120 (downlink direction).

Furthermore, a GPS (global positioning system) module 16 is optionally provided for ascertaining first pieces of position information P1 (FIG. 1).

FIG. 5 schematically shows a simplified flow chart of a method according to further specific embodiments. In step 220, an initial timing advance value TA1 is ascertained by user station 110*a* (FIG. 1) from first and second pieces of position information P1, P2, which is usable, for example, for a first uplink data transmission Dl from user station 110*a* to master station 120. In particular, this first uplink data transmission from user station 110*a* to master station 120 may include a RACH (random access channel) method.

In step 222, which corresponds, for example, to a running data transmission (i.e., for example, after a successful first uplink data transmission), a relative position and/or speed is ascertained between user station 110*a* and master station 120, and/or a position and/or speed of objects 130 in the surroundings is ascertained (in accordance with pieces of surroundings information UI), which may utilize higher processing layers.

In step 224, further timing advance values for future uplink data transmissions to master station 120 may be ascertained using the pieces of information ascertained in preceding steps 222, 224. In particular, the pieces of information ascertained in preceding steps 222, 224 may be combined.

Furthermore, according to step 226, pieces of information about possible timing advance values may be ascertained using test signals. This may be carried out, for example, in a signal processing layer of components 110*a*, 110*b*, 120 of system 120. The pieces of information ascertained in step 226 may also advantageously be incorporated in step 224. Furthermore, an optimization and/or plausibility check of timing advance values may be carried out in step 224, in particular on the basis of the pieces of information obtained in steps 220, 222, 226.

The principle according to the specific embodiments may advantageously be used for the estimation, in particular the initial estimation, of timing advance (also referred to as time advance) values for uplink transmissions in CDMA systems 100. The timing advance values are advantageously usable to equalize distance differences of various user stations 110*a*, 110*b* in relation to master station 120 to enable the reception, which may be simultaneous, of all uplink signals of user stations 110a, 110b at master station 120.

In particular, for a high-speed data transmission of multiple or all user stations 110a, 110b in the uplink of CDMA system 100, a synchronization of individual user stations 110a, 110b among each other and/or with respect to master station 120 is advantageous to ensure that the uplink signals of these user stations arrive essentially simultaneously at master station 120, whereby multi-access interferences may advantageously be reduced or avoided. Following the principle according to the specific embodiments, the timing advance values for the synchronization may particularly advantageously be initially determined (first timing advance value TA1) and also continuously adapted, for example, to a changed distance dl (FIG. 1) between master station 120 and user station 110a (second timing advance value TA2), if user stations 110a, 110b and/or master station 120 move or surroundings U, 130 change during the transmission. The adaptation of the timing advance values may be carried out on the signal processing level in further specific embodiments.

In further specific embodiments, knowledge about the position, the speed, and the movement direction of user stations 110a, 110b is provided, in particular on the application level of user stations 110a, 110b, for example, by way of separate sensors 16 (FIG. 4). In addition, there is the possibility that pieces of surroundings information UI are additionally available, which enable an inference about the influencing of the communication by surroundings U (for example, objects 130).

Based on position P1, P2 and pieces of surroundings information UI (or also only based on position P1/P2), in further specific embodiments, an initial estimation of the timing advance values of some, which may be all user stations 110a, 110b is made, which is possibly optimized later by a fine adjustment on the signal processing level. The adaptation may also be carried out predictably in further specific embodiments, for example, in consideration of a known relative speed between elements 110a, 120.

Further special advantages of the principle according to the specific embodiments are that a complex computation of the position information is not required for the initialization, since according to specific embodiments, the timing advance values of user stations 110a, 110b result directly from the distance to master station 120, which saves complexity.

In addition, in further specific embodiments, overhead may be saved if test signals have to be transmitted more rarely due to the incorporation of pieces of position, speed, and surroundings information P1, P2, UI.

In further specific embodiments, the sequence of a method for ascertaining the timing advance values takes place in two phases: if new user stations are added to CDMA system 100 (FIG. 1), an initialization phase is thus executable, cf. first timing advance value TA1. During running operation, i.e., after the first phase or initialization phase, the timing advance values may advantageously also be ascertained in different ways than in the initialization phase.

An initialization phase of the communication using CDMA communication system 100 according to further specific embodiments is described hereafter. If, for example, CDMA communication system 100 is initialized or a new user station 110a is added, all participants or new user 110a may thus establish initial timing advance values TA1 for the first time in the uplink, in particular so that multiple access interferences do not occur. Since pieces of position and surroundings information P1, P2, UI are known in further specific embodiments, the propagation time of the signal (originating from a user station 110a) to master station 120 may be computed from these pieces of information. In the case of a line-of-sight (LOS) connection, the propagation time may be computed, for example, with the aid of the speed of light and distance dl. In the case of a non-line-of-sight (NLOS) [connection], according to further specific embodiments, it may be presumed that the timing advance value increases in comparison to the direct connection. This may then be estimated (NLOS case), for example, via pieces of surroundings information UI.

In further specific embodiments, an update is provided during a running transmission. During a running transmission, the changes of the timing advance values may be adapted, for example, to a changed position P1, P2 or changed surroundings U. This may take place, for example, using a closed loop controller, which operates using test signals (for example, pieces of control information SI), in which, however, the knowledge of the signal propagation time, for example, which may be determined, for example, from pieces of position, movement, and surroundings information P1, P2, UI, are also incorporated as influencing values.

What is claimed is:

1. A method for operating a user station for a mobile communication system, the method comprising:
   ascertaining, by the user station, a first timing advance value for a data transmission from the user station to at least one master station as a function of first pieces of position information characterizing the position of the user station, wherein the mobile communication system includes the at least one master station and uses code division multiple access (CDMA); and
   transmitting first data to the at least one master station using the first timing advance value;
   wherein the ascertainment of the first timing advance value includes ascertaining, by the user station, surroundings information regarding surroundings of the user station, the surroundings information including information about a presence of an object in a line-of-sight between the user station and the at least one master station, the user station ascertaining the first timing advance value taking into consideration the presence of the object based on the ascertained surroundings information;
   wherein the user station ascertains the first timing advance value taking into consideration: (i) a relative speed of the user station and the at least one master station, and/or (ii) a position of the object, and/or (iii) a speed of the object;
   wherein the user station ascertains the first timing advance value taking into consider the position of the object and/or the speed of the object;
   wherein the user station continuously adapts, during the transmission, the first timing advance value based on changes, during the transmission, of a distance between the master station and the user station or of the surroundings of the user station;
   wherein the user station carries out a plausibility check of the ascertained first timing advance value based on the relative speed of the user station and the at least one master station.

2. The method of claim 1, wherein the ascertainment of the first timing advance value is carried out as a function of the first pieces of position information and second pieces of position information, which characterize a position of the master station.

3. The method of claim 1, further comprising:
ascertaining whether a line-of-sight condition exists for the data transmission from the user station to the master station.

4. The method of claim 1, wherein the first timing advance value is ascertained as a function of the distance between the user station and the master station.

5. The method of claim 1, further comprising:
receiving pieces of control information from the master station with respect to a second timing advance value to be used for future data transmissions to the master station, in particular ascertaining the second timing advance value as a function of at least one of the following elements: first timing advance value, first pieces of position information, second pieces of position information, pieces of surroundings information, pieces of control information.

6. The method of claim 1, wherein data transmissions from the user station to the master station are synchronized.

7. The method as recited in claim 1, wherein the ascertainment of the first timing advance value includes the user station determining a position of the at least one master station using a list or map that the user station has, the list or map being a list or map of a plurality of master stations with their positions.

8. The method as recited in claim 7, wherein based on the list or map, the user station ascertains a closest master station or a position of the closest master station.

9. The method as recited in claim 1, wherein the user station ascertains the first timing advance value taking into consideration the position of the object.

10. The method as recited in claim 1, wherein the user station ascertains the first timing advance value taking into consider the speed of the object.

11. The method as recited in claim 1, wherein the user station ascertains the first timing advance value taking into consideration the position of the object and the speed of the object.

12. The method as recited in claim 1, wherein the user station ascertains the first timing advance value taking into consideration the relative speed of the user station and the master station.

13. A user device for a mobile communication system, which includes at least one master station, using code division multiple access (CDMA), comprising:
a user station comprising: a memory; a processor and configured to perform the following:
ascertaining a first timing advance value for a data transmission from the user station to the master station as a function of first pieces of position information characterizing the position of the user station; and
transmitting first data to the master station using the first timing advance value;
wherein the ascertainment of the first timing advance value includes ascertaining, by the user station, surroundings information regarding surroundings of the user station, the surroundings information including information about a presence of an object in a line-of-sight between the user station and the at least one master station, the user station ascertaining the first timing advance value taking into consideration the presence of the object based on the ascertained surroundings information;
wherein the user station ascertains the first timing advance value taking into consideration: (i) a relative speed of the user station and the at least one master station, and/or (ii) a position of the object, and/or (iii) a speed of the object;
wherein the user station ascertains the first timing advance value taking into consider the position of the object and/or the speed of the object;
wherein the user station continuously adapts, during the transmission, the first timing advance value based on changes, during the transmission, of a distance between the master station and the user station or of the surroundings of the user station;
wherein the user station carries out a plausibility check of the ascertained first timing advance value based on the relative speed of the user station and the at least one master station.

14. The user device of claim 13, wherein the user station is configured to ascertain the first timing advance value as a function of the first pieces of position information and second pieces of position information, which characterize a position of the master station.

15. The user device of claim 13, wherein the ascertainment of the first timing advance value includes the user station determining a position of the at least one master station using a list or map that the user station has, the list or map being a list or map of a plurality of master stations with their positions.

16. The user device of claim 15, wherein based on the list or map, the user station ascertains a closest master station or a position of the closest master station.

17. A mobile communication system using code division multiple access (CDMA), comprising:
at least one master station; and
at least one user station comprising: a memory; a processor and configured to perform the following:
ascertaining a first timing advance value for a data transmission from the user station to the master station as a function of first pieces of position information characterizing the position of the user station; and
transmitting first data to the master station using the first timing advance value;
wherein the ascertainment of the first timing advance value includes ascertaining, by the user station, surroundings information regarding surroundings of the user station, the surroundings information including information about a presence of an object in a line-of-sight between the user station and the at least one master station, the user station ascertaining the first timing advance value taking into consideration the presence of the object based on the ascertained surroundings information;
wherein the user station ascertains the first timing advance value taking into consideration: (i) a relative speed of the user station and the at least one master station, and/or (ii) a position of the object, and/or (iii) a speed of the object;
wherein the user station ascertains the first timing advance value taking into consider the position of the object and/or the speed of the object;
wherein the user station continuously adapts, during the transmission, the first timing advance value based on changes, during the transmission, of a distance between the master station and the user station or of the surroundings of the user station;
wherein the user station carries out a plausibility check of the ascertained first timing advance value based on the relative speed of the user station and the at least one master station.

18. The mobile communication system as recited in claim 17, wherein the ascertainment of the first timing advance value includes the user station determining a position of the at least one master station using a list or map that the user station has, the list or map being a list or map of a plurality of master stations with their positions.

19. The mobile communication system as recited in claim 18, wherein based on the list or map, the user station ascertains a closest master station or a position of the closest master station.

* * * * *